United States Patent [19]

Logan et al.

[11] Patent Number: 4,875,317

[45] Date of Patent: Oct. 24, 1989

[54] MOLDED VENT

[76] Inventors: John R. Logan, R.R. #3, Dunn Road; Donald C. Wickens, Box 4, Bluewater Beach, R.R. #1, both of, Harrow, Ontario N0R 1G0, Canada

[21] Appl. No.: 161,194

[22] Filed: Feb. 26, 1988

[51] Int. Cl.⁴ .......................... E06B 3/00; B29C 17/04
[52] U.S. Cl. .......................................... 52/208; 52/302; 52/473; 425/388
[58] Field of Search ................. 52/473, 302, 303, 204, 52/208, 211; 425/380, 405.1; 49/501

[56] References Cited

U.S. PATENT DOCUMENTS

| | | | |
|---|---|---|---|
| 2,480,562 | 8/1949 | Ewing | 52/473 |
| 3,011,422 | 12/1961 | Scallon | 52/473 |
| 3,577,593 | 5/1971 | Jackson | 425/388 |
| 4,598,520 | 7/1986 | Ellstrom | 52/456 |

FOREIGN PATENT DOCUMENTS 2042775  7/1971  Fed. Rep. of Germany ........ 52/473

Primary Examiner—James L. Ridgill, Jr.
Attorney, Agent, or Firm—Dykema Gossett

[57] ABSTRACT

A simulated architectural component such as a framed window or vent is formed by vacuum molding, and includes an undercut or recess on the laterally outer edges of a surrounding frame portion. The undercut is adapted to receive and conceal the abutting edges of aluminum or plastic siding panels of an exterior wall into which such component is installed. The undercut is formed during the vacuum molding process by the use of a split ring which is removed from the mold with the finished part and is thereafter separated from the part as permitted by its split construction.

2 Claims, 1 Drawing Sheet

MOLDED VENT

BACKGROUND OF THE INVENTION

In exterior building construction utilizing aluminum or plastic siding panels, it is conventionally necessary to conceal the ends of strips of siding which occur at corners or at windows and doors by the use of J-tracks. These tracks have a J-shaped cross-section, with the long leg of the J facing against the supporting structure of the building to serve as a nailing flange and with the short leg of the J being exposed in front of the siding panel. Thus, the raw ends or edges of the siding panel are received in the pocket formed behind the short leg of the J. When the siding comes up to the lateral edges of a door or window, the bottom of the loop of the J abuts the side of the door or window frame.

While the use of J-tracks is common and acceptable for typical vertical or horizontal edges conventionally associated with the perimeter of windows and doors, such tracks cannot easily or practically be used to finish the edges around circular or curved inserts in an exterior wall, such as may be associated with decorative windows or louvres. The problem which arises in connection with such curved edges is the difficulty of obtaining a clean edge because the legs or flanges of the J-track must be slit or notched every inch or so to permit such track to conform to the curving perimeter of the rounded or circular window or vent which is being applied to the wall.

The use of a J-track in such applications could be avoided if there were a feasible way to form a recess or undercut around the perimeter of the curved window or louvre insert. Such an undercut, if it is to be formed in a molded plastic insert, must generally be created by the use of a mold insert which remains a part of the finished product or, in injection molding, by the use of slides in the mold. The use of slides, however, is generally not feasible in vacuum-forming because such slides interfere with the ability to clamp the plastic blank in place over the cavity of a vacuum-forming mold.

Accordingly, it is the primary object of the present invention to provide a vacuum-formed window or vent insert, and the method of making such insert, wherein the perimeter can be curved and formed with an undercut to receive the adjacent edges of the aluminum or plastic siding.

SUMMARY OF THE INVENTION

The perimeter of a curved window or vent insert is formed with an undercut or pocket to receive the edges of the adjacent aluminum or plastic sliding. Such product is fabricated of thin-walled plastic by the use of the vacuum-forming technique, with the undercut being formed by a split ring which is initially supported on a ledge in the mold and which is removed from the mold with the finished part. Thereafter, the split ring is removed from the part by laterally separating the ring segments in a direction perpendicular to the direction of removal of the molded part from the mold.

DETAILED DESCRIPTION OF THE DISCLOSURE

Figure 1:
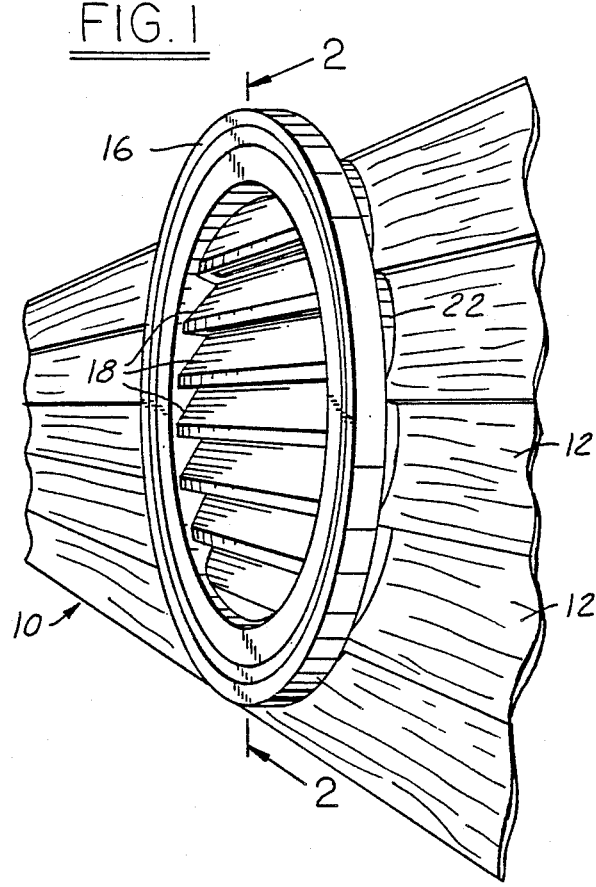
FIG. 1 is a perspective view of a circular molded plastic vent and a portion of the adjacent exterior siding.
Figure 2:
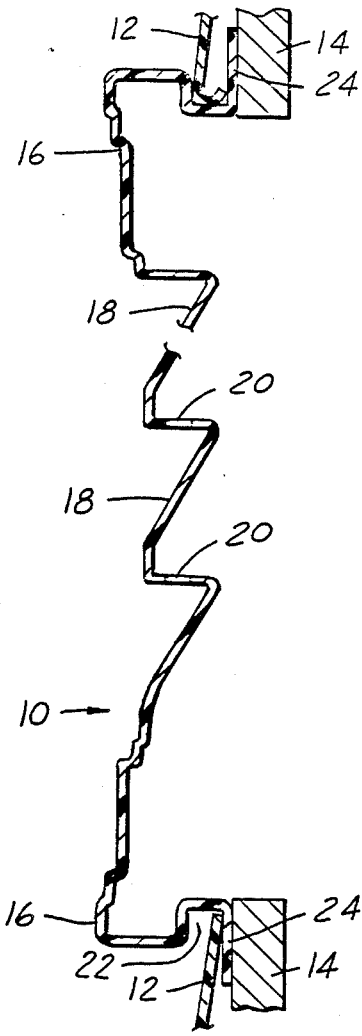
FIG. 2 is a fragmentary vertical cross-section viewed in the direction of arrows 2—2 of FIG. 1.

Referring to FIGS. 1 and 2 of the drawing, there is illustrated a molded vent 10 inserted in an exterior wall faced with a series of conventional aluminum or plastic siding panels 12 which are in turn secured in conventional fashion (not illustrated) to the underlying sheathing 14. While a molded vent is illustrated, it is to be understood that the insert to the wall could alternatively be a window, and the shape of either the vent or the window can be circular, half-round, rectangular, octagonal or any other desired shape.

The molded vent includes a frame portion 16 which surrounds the entire perimeter and a series of parallel individual louvres 18, each including a narrow ventilation slot 20. The laterally outward edges of frames 16 have a continuous undercut 22 located between the forward or frontward-facing portion of the frame and the back or rearward-facing nailing flange 24. Although not illustrated, it is contemplated that the vent would have a sheet of screen material secured to the back face of nailing flange 24 to prevent insects from entering the building through ventilation slots 20. Nailing flanges 24 serves the additional function of providing a barrier to prevent water from blowing or otherwise leaking past the perimeter of the insert and into the building.

Figure 3:
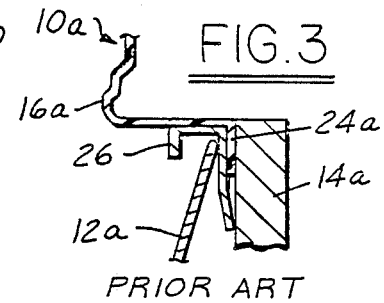
FIG. 3 is a fragmentary cross-sectional view, similar to a portion of FIG. 2, showing the prior art use of a J-track.

A comparison of the cross-sectional construction of the present invention, as shown in FIG. 2, with the prior art construction shown in FIG. 3, will illustrate the manner in which undercut 22 provides the siding panel-concealing recess previously furnished by the supplementary J-track 26. Thus, as shown in FIG. 3, the frame portion 16a of a typical prior art window or vent construction, which was not provided with an undercut, was abutted by the bottom portion of J-track 26. The long leg of the J-track served as the nailing flange to secure the track to the underlying sheathing, while the short leg of the J-track served to conceal the terminal edge of siding panel 12a. The problems associated with trying to conform a J-track to a curved perimeter, as described above, are eliminated by the present invention.

Figure 4:
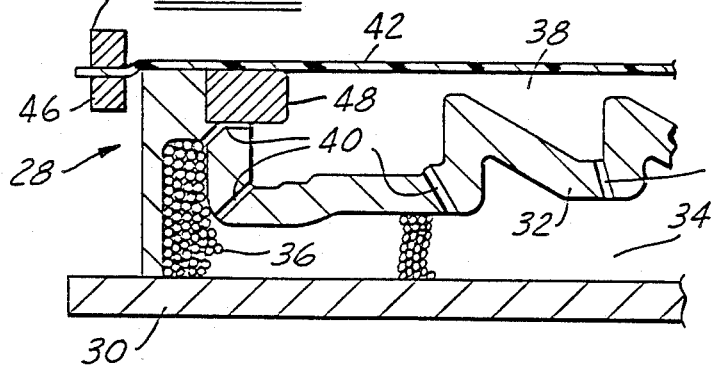
FIG. 4 is a fragmentary cross-sectional view of a portion of a vacuum-forming mold made in accordance with the present invention.

FIG. 4 illustrates the novel mold assembly 28 of the present invention. Such assembly comprises a rigid back plate 30, which can be fabricated of aluminum, upon which is secured the contoured cavity-defining mold 32, which can be formed of cast epoxy or a conventional high-temperature aluminum such as is conventionally used for vacuum forming or injection molding. The epoxy cavity-defining portion of the mold is backed by a vacuum chamber 34 filled with glass beads 36, which beads provide the dual function of strength and the necessary porosity to permit the extraction of air from cavity 38 while air passages 40 when the mold is connected to a vacuum pump (not illustrated).

In use, a preliminarily heat-softened blank 42 is clamped in place over cavity 38 by a pair of opposed clamping frame members 44, 46. However, prior to loading of the blank onto the mold, a removable split ring 48 is placed on a ledge of mold surface 32. In the case of a simple circular-bordered frame, split ring 48 would consist of two semicircular arcs whose ends abut to form a complete circle when nested into the mold ledge. Such rings can be fabricated of epoxy. If necessary, to help hold the rings in place on the ledge, a small V-shaped groove (not illustrated) can be placed in the upward-facing portion of the ledge, which groove can receive a similarly shaped rib in the bottom face of the ring.

Once blank 42 is clamped in place and the vacuum applied to the mold, the heat-softened blank will be forced by air pressure on its upper face to conform to the shape of cavity 38. Specifically, undercut 22 in frame portion 16 will be formed by the conformance of the blank to the surfaces of split ring 48.

When the vacuum-forming step is completed, clamping frame 44, 46 is released and the formed vent 10, along with the temporarily interlocked split ring 48, is lifted from mold assembly 28. Once removed, split ring 48 can be split apart and laterally separated from undercut 22 of vent 10.

Advantageously, the molded vent of the present invention can be placed over a previously installed standard vent as part of a retrofit. Alternatively, a previously installed vent can be removed and the new vent of the present invention installed as part of a new siding installation. In the case of a brick wall, the bricks can simply abut the lateral edges of frame portion 16, without making use of the available undercut 22.

The vacuum-formed vent of the present invention is much lighter in weight than a comparable wood vent which it simulates, and can therefore be readily installed and supported simply by nailing it either to the underlying sheathing or to the previously applied original siding, without the need to secure it to underlying structure such as the wood framing of the exterior wall.

A preferred material for the molded vent of the present invention is ABS plastic, such as BASF "Luran S," which product has the desired stability to resist ultraviolet radiation.

Figure 5:
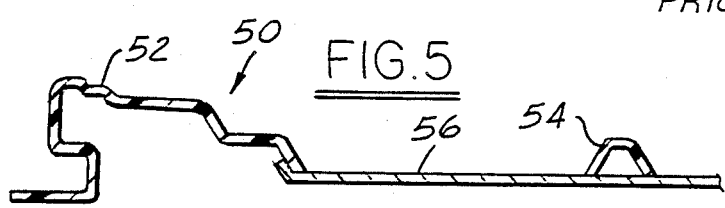
FIG. 5 is a fragmentary cross-sectional view of a vacuum-formed window made in accordance with the present invention.

FIG. 5 shows the construction of a vacuum-formed window, also provided with the necessary undercut 22. Window assembly 50 comprises a peripheral frame 52, which similarly can have a variety of geometric shapes, and integrally formed simulated mullions 54 (one of which is shown in fragmentary illustration). As will be understood by those skilled in the art, the portion of the plastic blank between the inner edge of frame portion 16 and mullion 54 must be stamped or otherwise cut out after vacuum forming to provide the openings for each simulated glass panel. The "glass" portion of window assembly 50 is simulated by a single clear acrylic panel 56 which is subsequently secured to the frame 52 and mullions 54 by silicone bonding.

This invention may be further developed within the scope of the following claims. Accordingly, the above specification is to be interpreted as illustrative of only two operative embodiments of the present invention, rather than in a strictly limited sense.

We now claim:

1. A combination including an architectural component adapted to be inserted into an opening formed in an exterior wall of thin-walled metal or plastic siding, comprising:

an exterior wall of thin-walled siding, said siding having an opening formed therein, edges of said siding being defined at the inner periphery of said opening;

a one-piece, vacuum-formed plastic frame portion forming a complete perimeter for the component, said frame portion including a back side adapted to face inward toward the interior of the building and a front side adapted to be exposed to view from the exterior of the building, said frame portion including a laterally outwardly projecting nailing flange on said back side, and said frame portion further including an undercut portion surrounding the complete perimeter of said frame portion, said undercut portion being located between said nailing flange and said front side and being recessed laterally inwardly from the laterally outer edges of both said nailing flange and said front side, thereby to form a peripheral pocket into which the siding edges which define the exterior wall opening can be received, said edges being essentially concealed from view by said front side of said frame portion; and said frame being in the form of a simulated window, said vacuum-formed frame portion being formed with at least one mullion spanning the space enclosed by said frame portion, further comprising a panel of clear plastic secured to the back side of said frame portion and spanning the entire space enclosed by said frame portion and behind said at least one mullion thereby to simulate a multi-panel glass window.

2. A combination including an architectural component adapted to be inserted into an opening formed in an exterior wall of thin-walled metal or plastic siding, comprising:

an exterior wall of thin-walled siding, said siding having an opening formed therein, edges of said siding being defined at the inner periphery of said opening;

a one-piece, vacuum-formed plastic frame portion forming a complete perimeter for the component, said frame portion including a back side adapted to face inward toward the interior of the building and a front side adapted to be exposed to view from the exterior of the building, said frame portion including a laterally outwardly projecting nailing flange on said back side, and said frame portion further including an undercut portion surrounding the complete perimeter of said frame portion, said undercut portion being located between said nailing flange and said front side and being recessed laterally inwardly from the laterally outer edges of both said nailing flange and said front side, thereby to form a peripheral pocket into which the siding edges which define the exterior wall opening can be received, said edges being essentially concealed from view by said front side of said frame portion; and said exterior wall having an upper and a lower portion, said frame portion having a plurality of louvers extending thereacross, said louvers being parallel to each other.

* * * * *